Patented Dec. 9, 1947

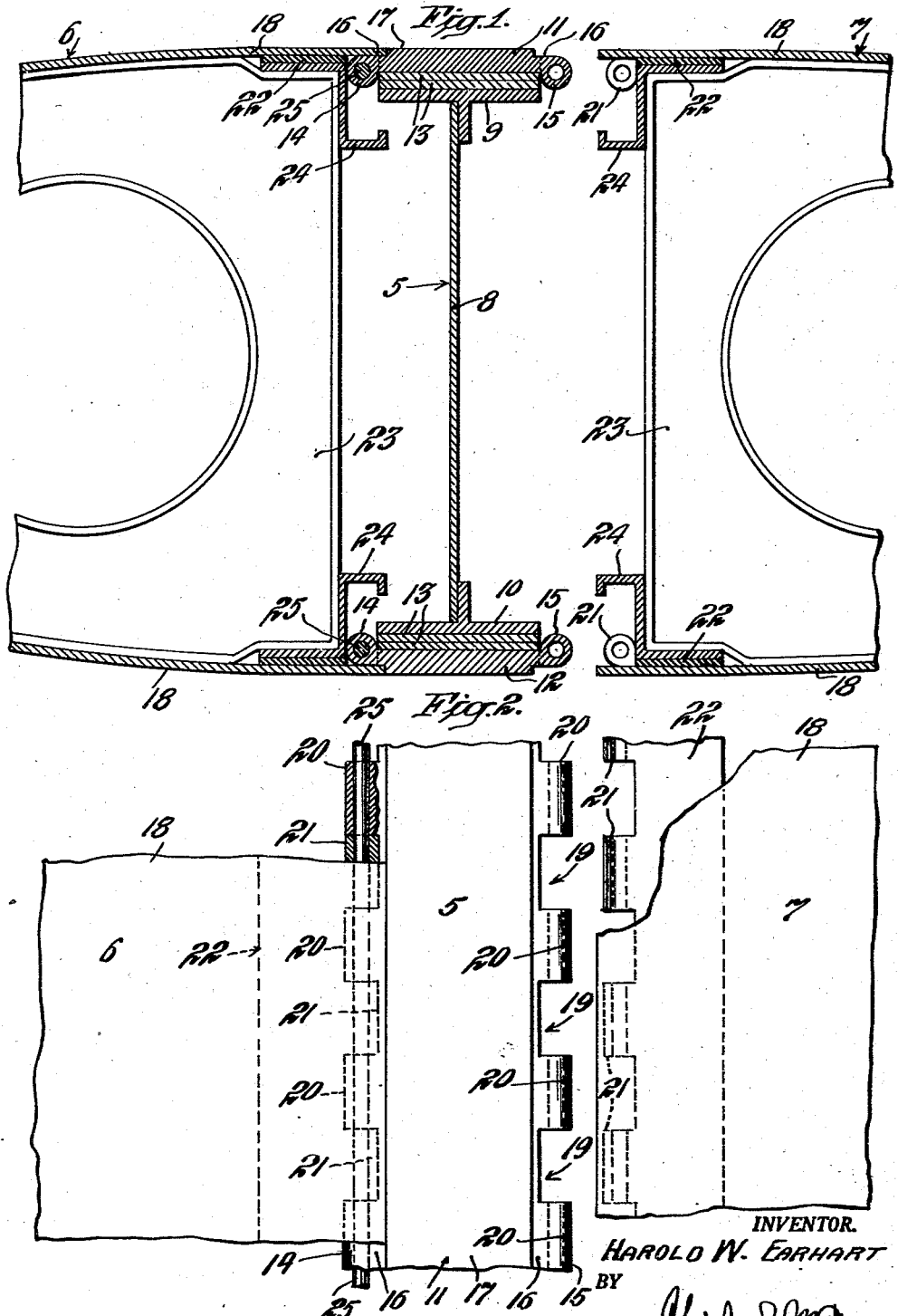

2,432,396

UNITED STATES PATENT OFFICE 2,432,396

AIRPLANE WING

Harold W. Earhart, Wichita, Kans., assignor to Beech Aircraft Corporation, Wichita, Kans., a corporation of Delaware Application November 29, 1944, Serial No. 565,713

4 Claims. (Cl. 244—124)

The invention here disclosed relates to the construction of airplane wings and airfoils generally.

Objects of the invention are to provide a strong, simple, mechanical structure adapted for unit fabrication and easy assembly and disassembly.

Other desirable objects and the novel features through which the purposes of the invention are attained are hereinafter set forth or will appear in the course of the following specification.

The drawing accompanying and forming part of the specification illustrates a present practical embodiment of the invention but structure may be modified and changed as regards this illustration, all within the true intent and broad scope of the invention as hereinafter defined and claimed.

Fig. 1 in the drawing is a broken cross-sectional view of an airplane wing having the invention embodied therein and showing the front or nose section of the wing as connected with the front spar and the aft or rear wing section as separated or unconnected;

Fig. 2 is a broken plan view of the parts shown in Fig. 1.

In the present illustrated example the wing is shown as made up of three structural components, the front spar unit 5, the leading edge unit 6 and the rearward unit 7.

The spar is shown as made up of a web element 8 having attached angle or T-flanges 9 and 10, providing a sheer web with T heads at top and bottom for carrying the top and bottom caps 11 and 12. Laminations 13 of any number and material may be interposed between the caps and heads of the spar, as required by loading conditions for any particular design.

The caps 11 and 12 are formed with tubular edge portions 14, 15, spaced to stand at opposite sides of the head portions of the spar and set inward at 16 from the intermediate outer contour surface 17 a distance substantially equal to the thickness of the skin 18 of the wing. These tubular edge portions, as shown particularly in the plan view, are notched at intervals as at 19, to provide in effect spaced knuckles or loops 20.

The forward and aft wing sections carry correspondingly spaced loops or knuckles to fit between and register with the loops on the spar, and the parts are connected by wires or rods inserted through the registered loops.

In the illustration, the registering and interfitting spaced loops 21 at the rearward edges of the forward wing section and at the forward edges of the rearward wing section are carried by strips 22 attached on the inside of the skin panels 18 and set inward from the edges sufficiently for such edge portions to overlap and seat in the insets 16 to close the joints over the connected knuckles. Connected as described, the caps and adjoining skin sections are thus in smooth, flush and substantially continuous surface relation.

The skins of the wing sections are secured and held by suitable contour forms 23 spaced at the inner edges of these sections by reenforcing and spacing flanges 24. The latter are shown secured over the loop carrying attachment strips 22.

The securing rods or wires 25 may be thrust into or led through the registered connecting loops of the wing sections and spar caps, and in this action the companion units are drawn together into closely interlocked mutually reenforcing relation. If wire is used, the same may be pulled through with a "fishwire." Means may be provided for securing the connecting wire or rod in place and, if desired, provision may be made for inspection. This wire or rod may be in sections instead of in one single, continuous length for each joint, and either the single length or the sections may be introduced by doubling at the center and feeding the ends in opposite directions through a gap at some more or less central point and such gap later closed by a suitable cover plate.

The cap plates and the attachment strips with their tubular edge loops, either or both may be formed as continuous extrusions and later notched to provide the effect of the spaced loops.

The spars and wing units can be made up separately and readily assembled at any time, or after assembly be taken apart at any time. The connections are strong and secure and do not add to the bulk or weight of the structure. The joints are covered over and protected and yet are accessible when such necessity may arise.

What is claimed is:

1. An airplane wing comprising a wing spar having a head portion, one or more laminations on said head portion, a cap secured over said one or more laminations and having spaced tubular extensions along the forward and the rearward opposite edges of the same, wing units forward and aft of said spar and having corresponding, registering, spaced tubular extensions entered between the tubular extensions along said forward and rearward edges of said cap, and wire or rod connectors extending through said registered tubular extensions.

2. An aircraft wing comprising a wing spar having a cap provided with a wing contour forming surface and with aligned attachment loops spaced along one edge and inset inwardly of said wing contour forming surface, a wing unit having corresponding aligned attachment loops along one edge spaced to fit between the attachment loops of the spar cap and disposed inwardly of the contour surface of the wing, skin panelling carried by said wing unit and extending as a cover over said inwardly inset attachment loops of the spar cap and wing unit and a single connecting element extending longitudinally through said registered loops and covered by said skin panelling.

3. An aircraft wing comprising a wing spar having aligned attachment loops spaced along one edge and inset inwardly of the contour surface of the wing, a wing unit having aligned attachment loops spaced along one edge to enter between the wing spar attachment loops and similarly inset inwardly of the wing contour surface, the skin of said wing unit extending over said inwardly inset attachment loops in said registered relation of the same and a single connecting element extending longitudinally through said registered attachment loops and covered by said projecting skin of the wing.

4. An aircraft wing comprising a wing spar having a cap provided with an intermediate wing contour surface and with spaced aligned attachment loops at opposite sides of said intermediate wing contour surface and inset inwardly of said wing contour surface, wing units at opposite sides of said spar and having aligned attachment loops spaced to enter between the attachment loops of the spar cap and inset inwardly of the contour surface of said wing units, said wing units having the skin of the same extended to cover said inwardly inset attachment loops of the spar cap and wing units and connecting elements extending longitudinally through the registered loops aforesaid and covered by said projecting skin of the wing units.

HAROLD W. EARHART.

REFERENCES CITED

The following references are of record in the file of this patent:

UNITED STATES PATENTS

| Number | Name | Date |
| --- | --- | --- |
| 1,388,457 | Fokker | Aug. 23, 1921 |
| 1,557,855 | Loudy | Oct. 20, 1925 |
| 1,988,085 | Orlando | Jan. 15, 1935 |
| 2,379,352 | Hardman | June 26, 1945 |